US012661681B2

(12) United States Patent
Lee et al.

(10) Patent No.: US 12,661,681 B2
(45) Date of Patent: Jun. 23, 2026

(54) DUAL SLOT DIE FOR SIMULTANEOUSLY PERFORMING ELECTRODE SLURRY COATING AND INSULATING SOLUTION COATING AND COATING METHOD USING THE SAME

(71) Applicant: LG Energy Solution, Ltd., Seoul (KR)

(72) Inventors: Doo Hyun Lee, Daejeon (KR); Jae Huoung Son, Daejeon (KR); Chang Bum Ahn, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/027,667

(22) PCT Filed: Jul. 26, 2022

(86) PCT No.: PCT/KR2022/010946
§ 371 (c)(1),
(2) Date: Mar. 22, 2023

(87) PCT Pub. No.: WO2023/096070
PCT Pub. Date: Jun. 1, 2023

(65) Prior Publication Data
US 2024/0293837 A1    Sep. 5, 2024

(30) Foreign Application Priority Data

Nov. 29, 2021    (KR) ........................ 10-2021-0167169
Jul. 21, 2022    (KR) ........................ 10-2022-0090380

(51) Int. Cl.
*B05C 5/02* (2006.01)
*B05C 9/06* (2006.01)
(Continued)

(52) U.S. Cl.
CPC .............. *B05C 5/0254* (2013.01); *B05C 9/06* (2013.01); *B05C 9/12* (2013.01); *H01M 4/0404* (2013.01);
(Continued)

(58) Field of Classification Search
None
See application file for complete search history.

(56) References Cited

U.S. PATENT DOCUMENTS 5,425,967 A     6/1995   Tomaru
5,698,033 A     12/1997  Rieger et al.
(Continued)

FOREIGN PATENT DOCUMENTS

CN     204034968 U    12/2014
JP       06296917 A  * 10/1994   ........... B05C 5/0254
(Continued)

OTHER PUBLICATIONS

International Search Report for PCT/KR2022/010946 mailed Oct. 18, 22. 3 pgs. (see p. 2-3 categorizing the cited references).
(Continued)

*Primary Examiner* — Binu Thomas
(74) *Attorney, Agent, or Firm* — Lerner David LLP

(57) ABSTRACT

The present invention relates to a dual slot die and a coating method using the same, wherein there is the advantage that electrode slurry coating and insulating solution coating simultaneously proceed through a dual slot die to prevent the occurrence of electrode slurry sliding at the edge of the electrode slurry layer. An electrode slurry layer and an insulating layer can be formed on a current collector sheet in a multi-line manner by including a shim having a structure formed with multiple discharge lines capable of discharging the electrode slurry or insulating solution in multiple lines, thereby increasing process efficiency.

8 Claims, 10 Drawing Sheets

(51) Int. Cl.
    *B05C 9/12*         (2006.01)
    *H01M 4/04*      (2006.01)
    *H01M 4/36*      (2006.01)
    *H01M 4/62*      (2006.01)

(52) U.S. Cl.
    CPC ............ *H01M 4/366* (2013.01); *H01M 4/62*
         (2013.01); *B05C 5/027* (2013.01)

(56)       References Cited

U.S. PATENT DOCUMENTS

| | | | |
|---|---|---|---|
| 2002/0197535 A1 | 12/2002 | Dudley et al. | |
| 2004/0231186 A1* | 11/2004 | Kolb ......................... | B05C 9/12 |
| | | | 34/500 |
| 2011/0242243 A1* | 10/2011 | Miyabayashi ............. | B41J 2/01 |
| | | | 347/102 |
| 2013/0260207 A1 | 10/2013 | Uemura | |
| 2015/0266044 A1* | 9/2015 | Park ................... | H01L 21/6715 |
| | | | 438/782 |
| 2018/0250701 A1 | 9/2018 | Kuenne | |
| 2019/0054495 A1 | 2/2019 | Tsukamoto et al. | |
| 2019/0351446 A1 | 11/2019 | Lee et al. | |
| 2019/0374971 A1* | 12/2019 | Horinouchi ............. | B05C 5/027 |
| 2020/0119333 A1 | 4/2020 | Masuzawa et al. | |
| 2020/0235428 A1 | 7/2020 | Park et al. | |
| 2022/0293895 A1* | 9/2022 | Lee ........................ | B05C 5/0254 |
| 2022/0302442 A1* | 9/2022 | Lee ........................ | B05C 5/0254 |
| 2022/0331832 A1 | 10/2022 | Choi et al. | |

FOREIGN PATENT DOCUMENTS

| | | | | |
|---|---|---|---|---|
| JP | H06296917 | A | 10/1994 | |
| JP | 2005509247 | A | 4/2005 | |
| JP | 2005270879 | A | 10/2005 | |
| JP | 2014137944 | A | 7/2014 | |
| JP | 2014229479 | A | 12/2014 | |
| JP | 2015026471 | A * | 2/2015 | |
| JP | 2016186945 | A | 10/2016 | |
| JP | 2017035668 | A * | 2/2017 | |
| JP | 6096077 | B2 | 3/2017 | |
| JP | 2017157471 | A | 9/2017 | |
| JP | 2018144030 | A | 9/2018 | |
| JP | 2019061943 | A | 4/2019 | |
| JP | 2019188332 | A | 10/2019 | |
| JP | 2020028839 | A * | 2/2020 | |
| JP | 2020505750 | A | 2/2020 | |
| JP | 2020107500 | A | 7/2020 | |
| JP | 2020528203 | A | 9/2020 | |
| JP | 6891850 | B2 | 6/2021 | |
| JP | 2021102177 | A | 7/2021 | |
| KR | 101626576 | B1 | 6/2016 | |
| KR | 20160070481 | A | 6/2016 | |
| KR | 20170094920 | A * | 8/2017 | ............ B05C 5/027 |
| KR | 101845117 | B1 | 4/2018 | |
| KR | 102035826 | B1 | 10/2019 | |
| KR | 20190113912 | A | 10/2019 | |
| KR | 20200034426 | A | 3/2020 | |
| KR | 20210083512 | A | 7/2021 | |
| WO | 2012081543 | A1 | 6/2012 | |
| WO | 2017077696 | A1 | 5/2017 | |
| WO | 2019022522 | A1 | 1/2019 | |

OTHER PUBLICATIONS

Extended European Search Report for Application No. 22862357.5 dated Apr. 4, 2024. 11 pgs.

\* cited by examiner

[FIG. 1]
PRIOR ART
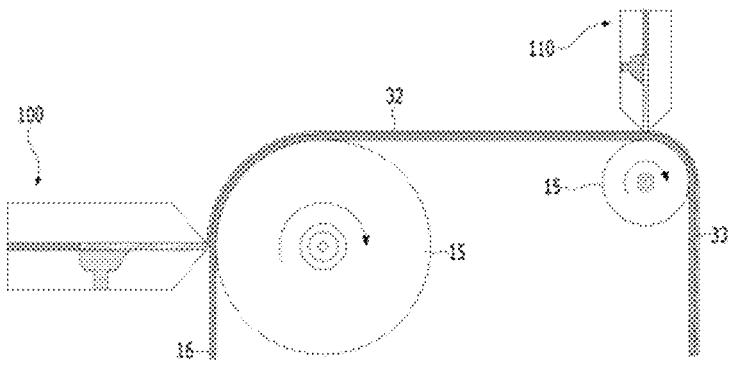
[FIG. 2]
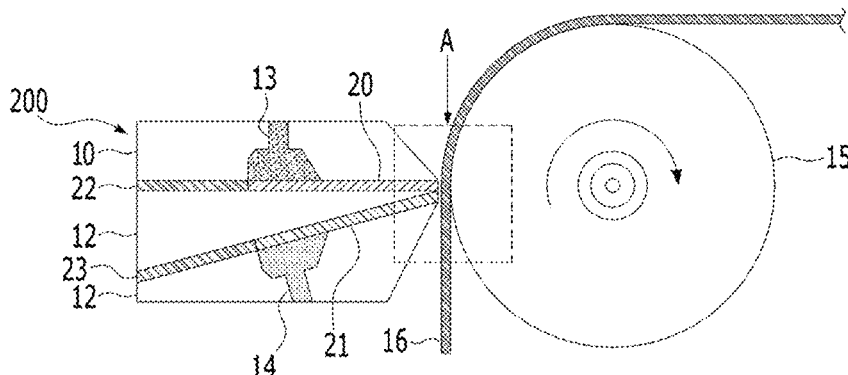

【FIG. 3】
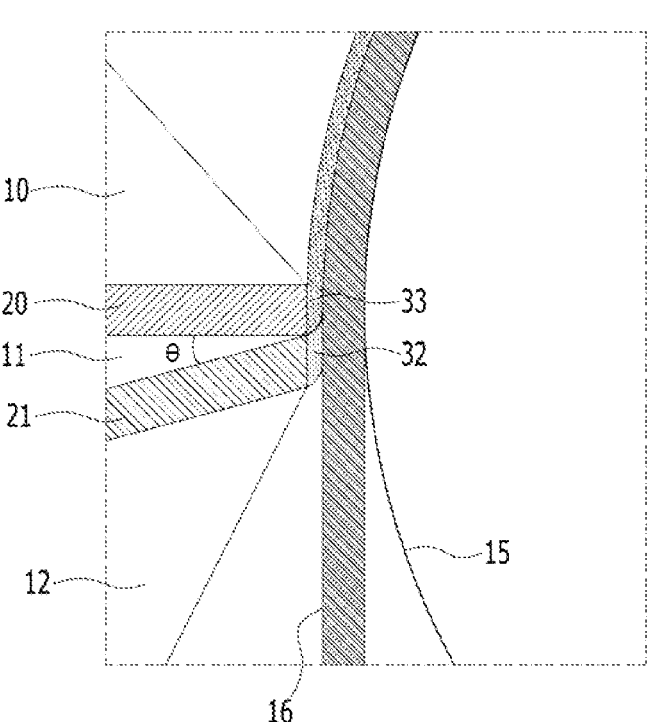

【FIG. 4】
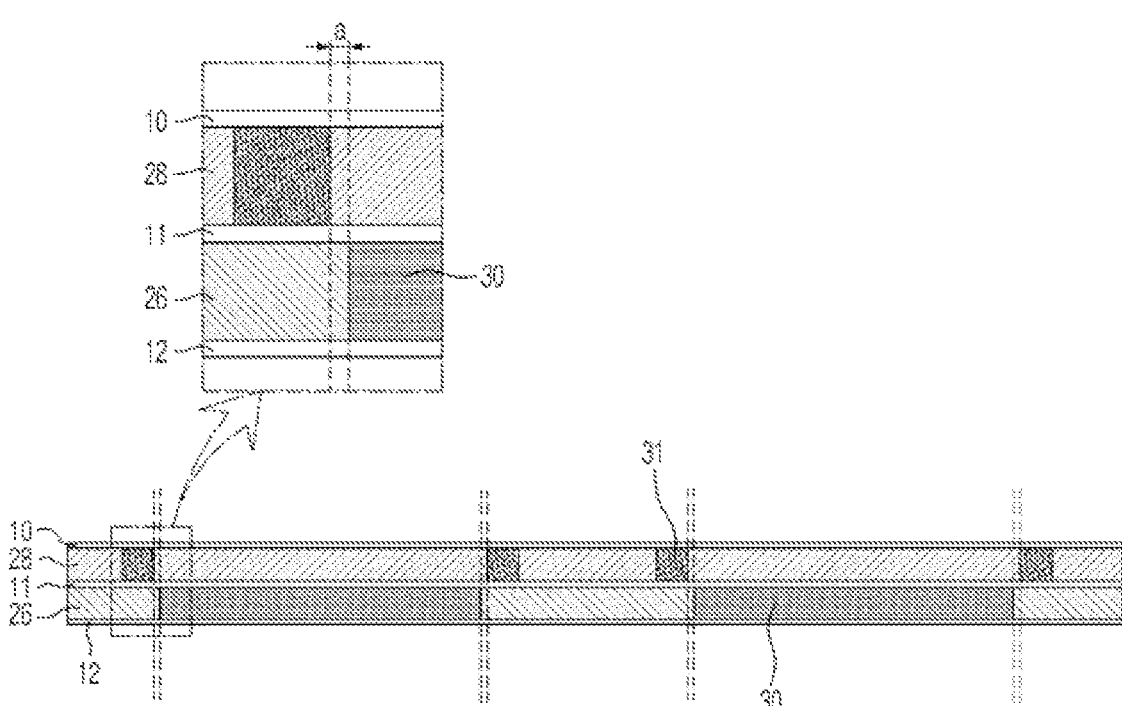

【FIG. 5】
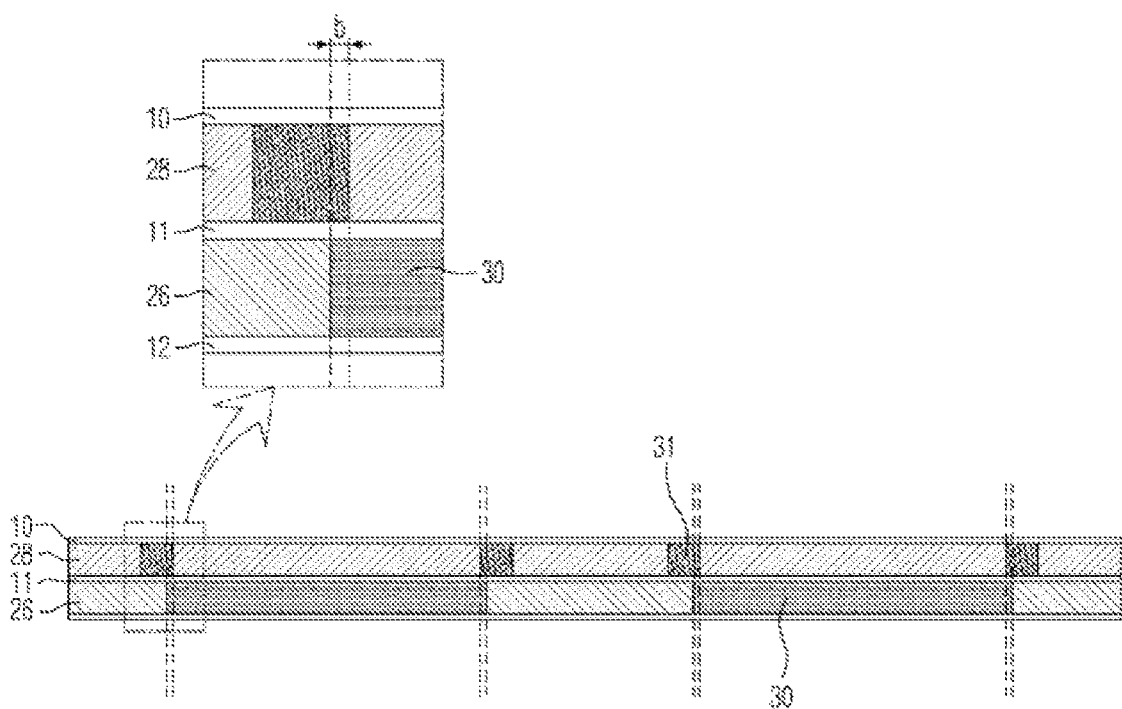

【FIG. 6】
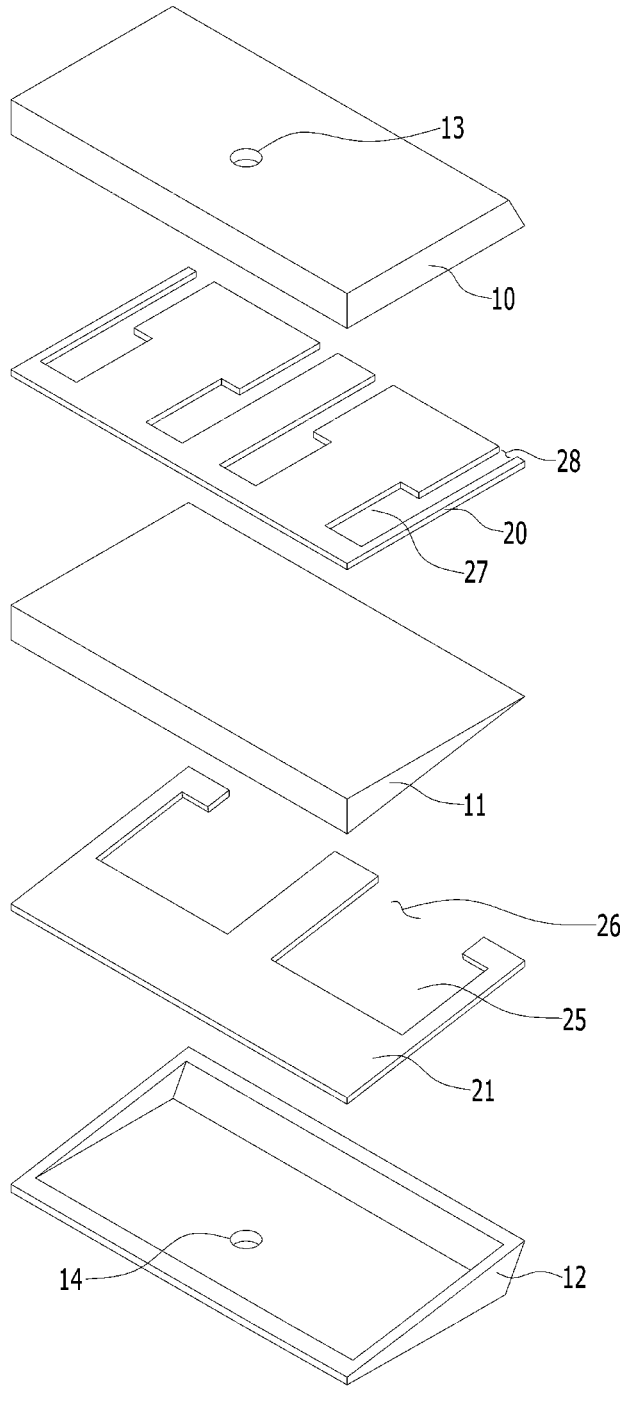

【FIG. 7】
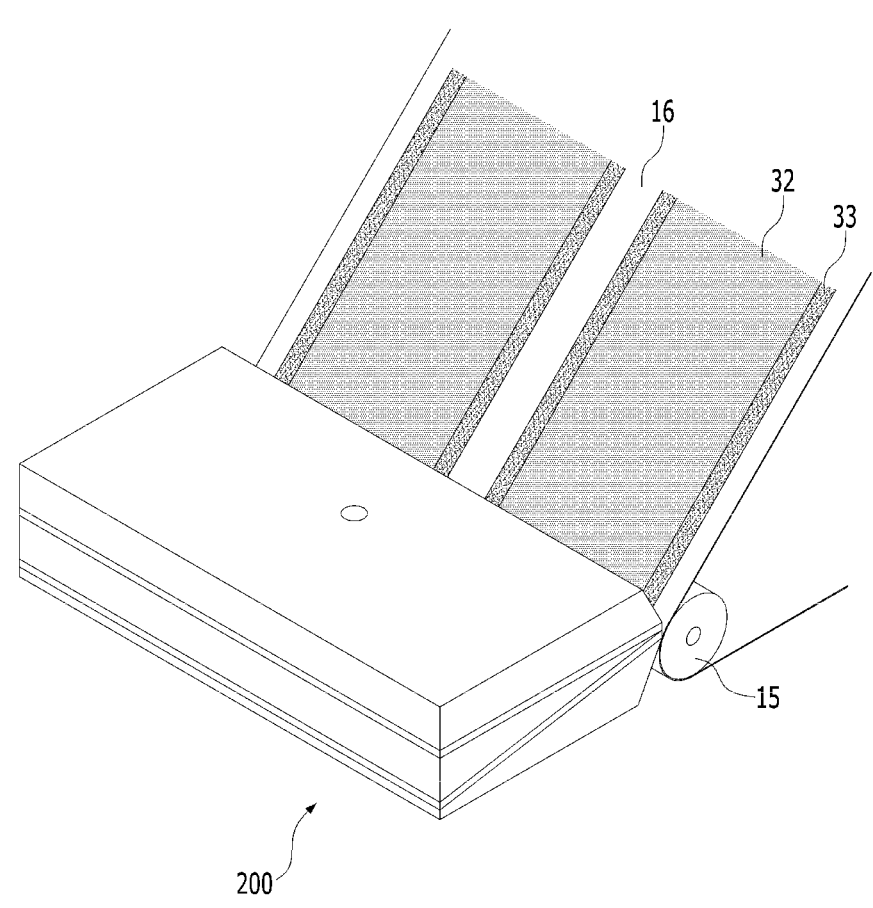

【FIG. 8】
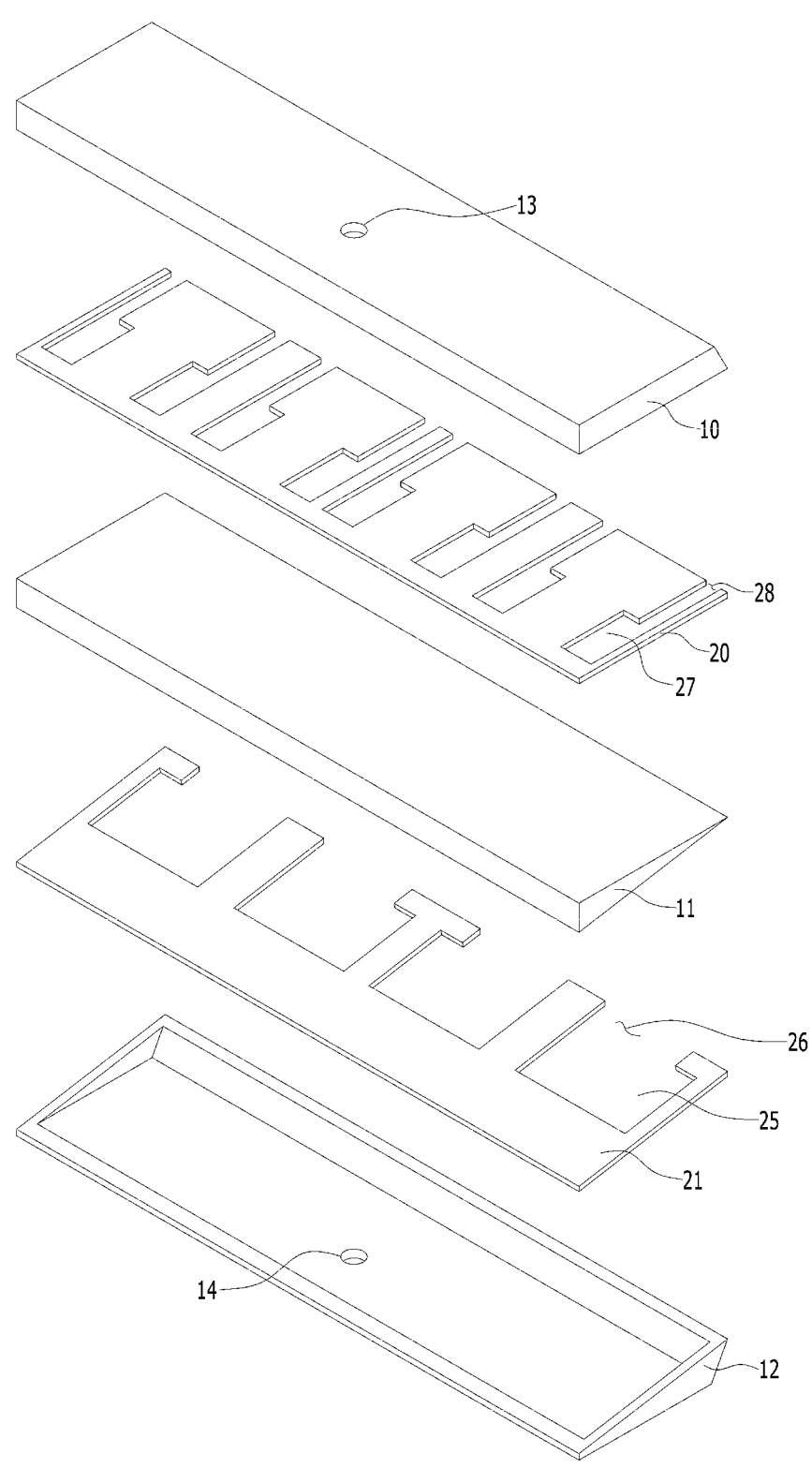

【FIG. 9】
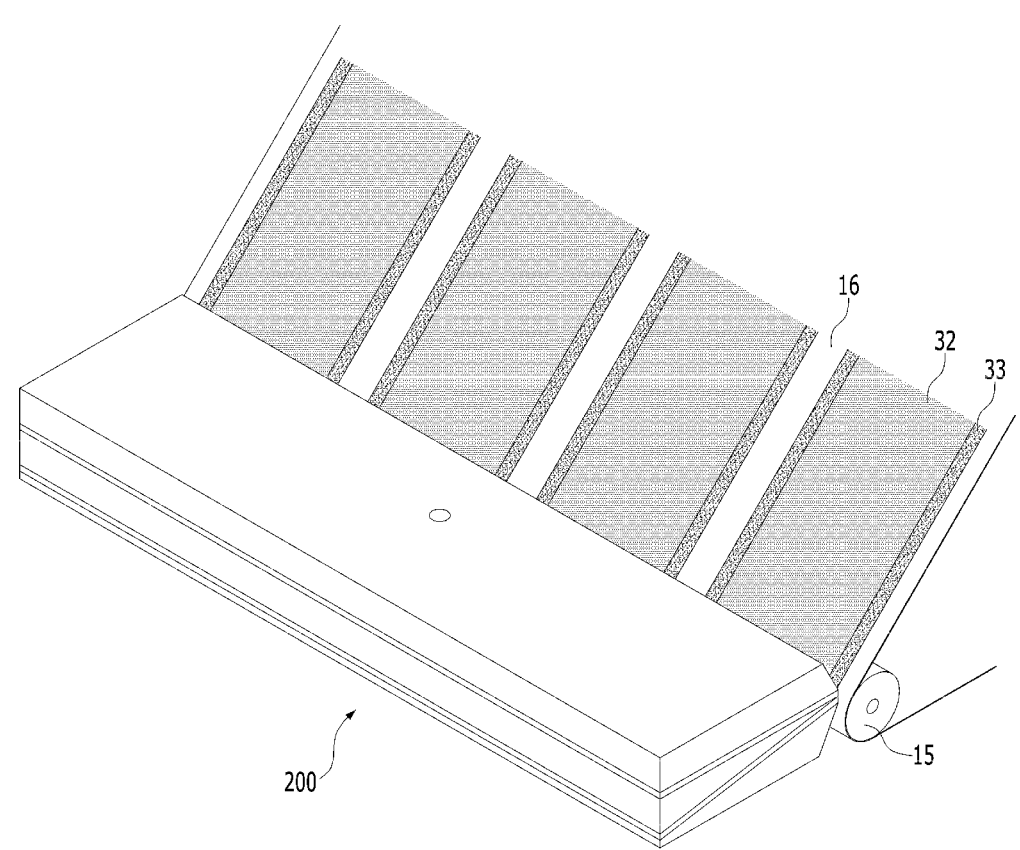

【FIG. 10】
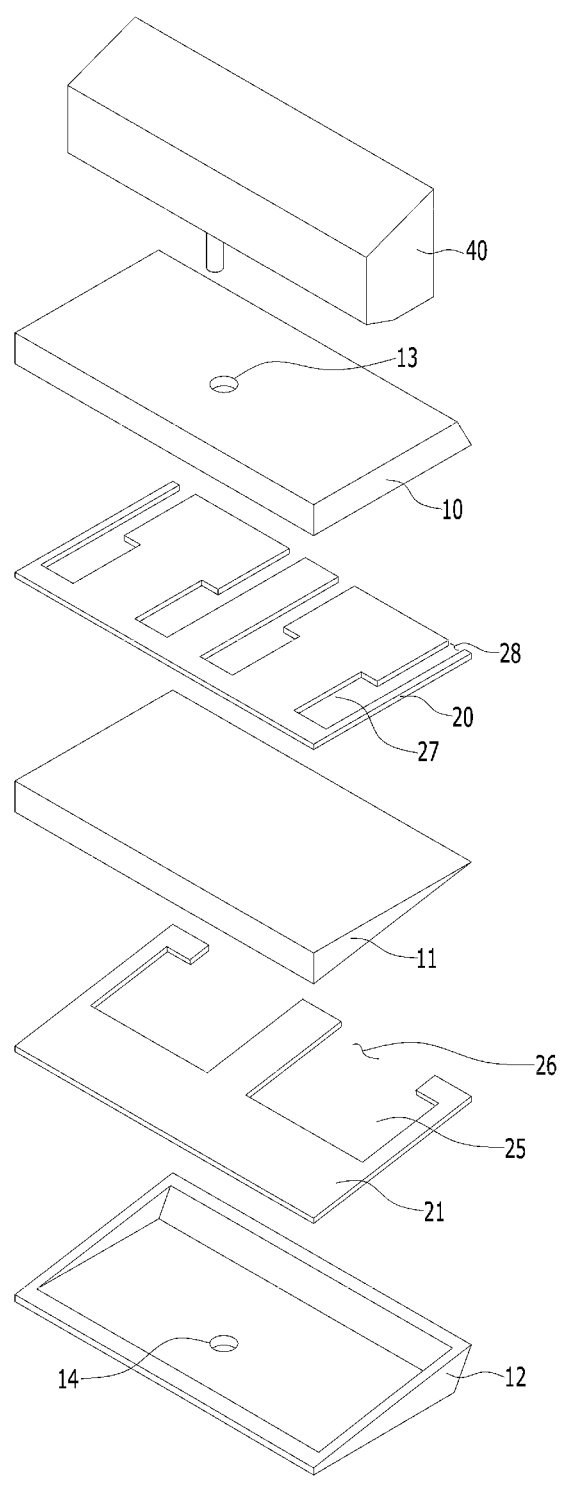

[FIG. 11]
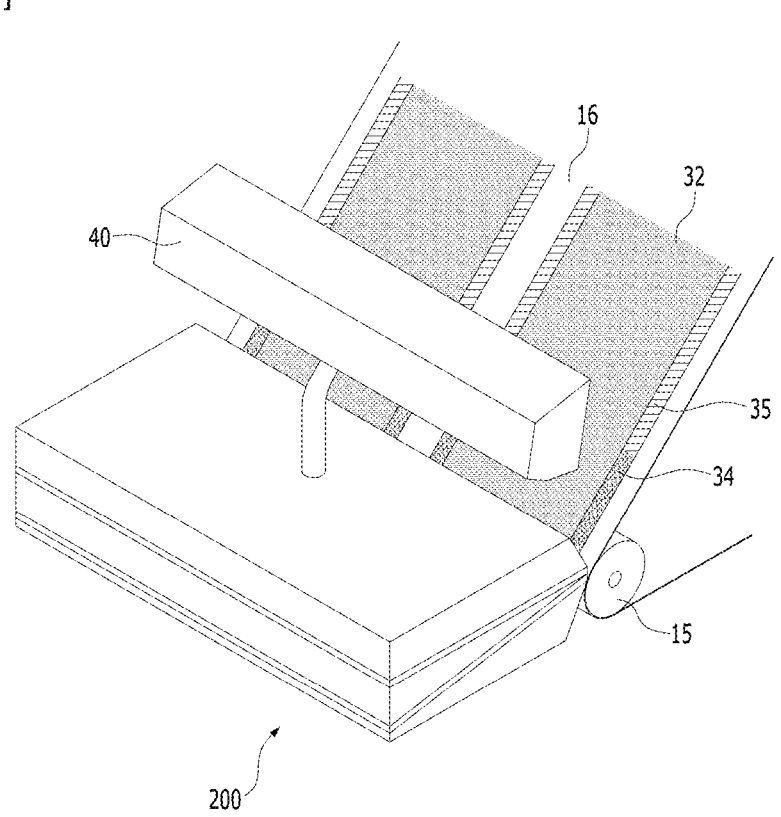

DUAL SLOT DIE FOR SIMULTANEOUSLY PERFORMING ELECTRODE SLURRY COATING AND INSULATING SOLUTION COATING AND COATING METHOD USING THE SAME

CROSS-REFERENCE TO RELATED APPLICATION

The present application is a national phase entry under 35 U.S.C. § 371 of International Application No. PCT/KR2022/010946 filed on Jul. 26, 2022, which claims the benefit of priority based on Korean Patent Application No. 10-2021-0167169 dated Nov. 29, 2021 and Korean Patent Application No. 10-2022-0090380 dated Jul. 21, 2022, and all contents published in the literature of the Korean patent applications are incorporated as part of this specification.

TECHNICAL FIELD

The present invention relates to a dual slot die for simultaneously performing electrode slurry coating and insulating solution coating, and a coating method using the same.

BACKGROUND ART

With the increase in technology development and demand for mobile devices, the demand for secondary batteries is also rapidly increasing. Among them, a lithium secondary battery has been widely used as an energy source for various electronic products as well as various mobile devices because it has high energy density and operating voltage and is excellent in storage and life characteristics.

Typically, there is a high demand for a prismatic battery and a pouch battery that can be applied to products such as cell phones and the like with a thin thickness in terms of the shape of the battery, and there is also a high need for a lithium secondary battery such as a lithium-cobalt polymer battery that is excellent in energy density, discharge voltage, and safety in view of the material.

One of the main research tasks in such a secondary battery is to improve safety. A major cause of safety-related accidents in batteries is the arrival of an abnormal high temperature state due to a short circuit between the positive electrode and the negative electrode. That is, in a normal situation, a separator is positioned between the positive electrode and the negative electrode to maintain electrical insulation, but in abnormal operation situation, such as in a situation in which the battery is over-charged or over-discharged, an internal short circuit due to dendritic growth of the electrode material or foreign matter occurs, or when sharp objects such as nails and screws penetrate the battery, the battery is deformed by an external force, the existing separator alone shows its limitations.

In general, a microporous membrane made of a polyolefin resin is generally used as the separator, but the heat resistance temperature is about 120° C. to 160° C., so the heat resistance is insufficient. Therefore, when an internal short circuit occurs, there has been a problem that the separator is shrunk by the short-circuit reaction heat to bring the positive electrode plate and the negative electrode plate into contact with each other, resulting in a thermal runaway state in which the short circuit portion inside the battery is enlarged and a larger amount of reaction heat is generated.

In general, a secondary battery is manufactured in a prismatic shape by cutting a positive electrode and a negative electrode to a predetermined size and overlapping several sheets thereof. At this time, the edges of the positive electrode or negative electrode coated with the polymer electrolyte have a very small needle-like sharp portion which is not noticeable and the stacking of the electrodes can cause fine internal short circuits in this part and adversely affect the performance of the battery. In particular, even when the edge is coated with a polymer electrolyte, since there are more irregular sides in the edge than in the inside, it is not evenly coated, so there is a high possibility of a short circuit. Also, when the electrodes of the lower and upper layers deviate even a little when stacking the electrodes, a short circuit between the positive electrode and the negative electrode may occur.

As such, various methods have been studied to lower the cell deformation or external impacts or the possibility of a physical short between the positive electrode and negative electrode, and for example, a method of attaching an insulating tape of a predetermined size on an electrode tab adjacent to the top of a current collector to prevent the electrode tab from touching the upper end of the electrode assembly and causing a short by moving the electrode assemblies while completing the cell. However, the winding operation of such an insulating tape is very complicated, and when winding the insulating tape to a length slightly extending downward from the top of the current collector, such a portion may cause an increase in the thickness of the electrode assembly. In general, as a method for attaching an insulating tape on an electrode tab as described above, a method has been adopted in which an electrode slurry is coated on a positive electrode and an insulating solution is coated in a region where the electrode slurry has not been coated, that is, in a non-coated region.

On the other hand, as a method of evenly coating the electrode active material slurry on the current collector sheet, a slot die coating process is typically performed. Furthermore, a slot die coating process is performed to coat the electrode active material slurry as well as the insulating solution on the current collector sheet. At this time, in order to coat the electrode active material slurry and the insulating solution on the current collector sheet, there is a coating process using a slot die for coating the electrode active material slurry and a separate slot die for coating the insulating solution.

FIG. 1 is a schematic diagram illustrating the formation of an electrode slurry layer and an insulating layer on a current collector sheet through an independent electrode slurry coating slot die and an independent insulating solution coating slot die in a conventional manner.

Referring to FIG. 1, the electrode slurry 30 may be coated onto the current collector sheet 16 moving along the coating roll 15 through an electrode slurry coating slot die 100 composed of two blocks, and the insulating solution 31 may be applied to have a constant width from the edge of the electrode slurry layer formed on the current collector sheet 16 through a separate insulating solution coating slot die 110.

However, the coating process using the above-described conventional slot die has a problem that the quality is lowered as an unwanted sliding phenomenon of the electrode slurry 30 occurs at the edge of the layer of electrode slurry in the course of the movement of the current collector sheet 16 coated with the electrode slurry 30 along the coating roll 15 through the electrode slurry coating slot die 100, and a problem that the unwanted disconnection or cambering of the current collector sheet 16, occurs as the distance between the electrode slurry coating slot die 100 and the insulating solution coating slot die 110 is increased.

In addition, the electrode slurry coating slot die 100 and the insulating solution coating slot die 110 are operated separately, so manufacturing efficiency is lowered, and it is difficult to finely control the width and thickness of the electrode slurry coating and the insulating solution coating.

Therefore, there is a need for a method to effectively improve these problems.

DISCLOSURE

Technical Problem

The present invention has been devised to solve the above problems, and an object of the present invention is to provide a dual slot die capable of simultaneously performing electrode slurry coating and insulating solution coating to prevent the occurrence of sliding of the electrode slurry at the edge of the layer of electrode slurry applied to the current collector sheet, and a coating method using the same.

Technical Solution

The present invention provides a dual slot die. In one example, a dual slot die according to the present invention is a dual slot die including a lower block, an intermediate block, and an upper block, the dual slot die including: a lower shim positioned between the lower block and the intermediate block; an upper shim positioned between the intermediate block and the upper block; a lower manifold formed in the lower block to store an electrode slurry; and an upper manifold formed in the upper block to store an insulating solution, the electrode slurry stored in the lower manifold is branched and discharged in n lines by electrode slurry discharge lines formed in the lower shim, and the insulating solution stored in the upper manifold is branched and discharged in 2n lines by insulating solution discharge lines formed in the upper shim, wherein n is an integer of 1 or more. For example, n is an integer ranging from 1 to 10, or from 1 to 5.

In a specific example, in the dual slot die according to the present invention, an angle at which the first plane extending the upper shim and the second plane extending the lower shim intersect forms an angle in the range of 20° to 60°.

In another specific example, the dual slot die according to the present invention may have a structure in which the width of an electrode slurry discharge portion, which is an open portion of the electrode slurry discharge line, and the width of an insulating solution discharge portion, which is an open portion of the insulating solution discharge line, do not overlap each other in the vertical direction of the cross-section of the upper shim.

In another specific example, in the dual slot die according to the present invention, in the vertical direction of the cross-section of the upper shim, the width of the electrode slurry discharge portion, which is an open portion of the electrode slurry discharge line, and the width of the insulating solution discharge portion, which is an open portion of the insulating solution discharge line, overlap each other, and the overlapping range is in the range of 5% to 30% of the width of the insulating solution discharge portion. The overlapping range means a ratio of a region in which the electrode slurry discharging portion and the insulating solution discharging portion overlap in the width direction based on 100% of the length in the width direction of the insulating solution discharging portion.

In another example, in the double slot die according to the present invention, in the direction in which the electrode slurry and the insulating solution are applied on the current collector sheet, the electrode slurry discharge portion, which is an open portion of the electrode slurry discharge line, is positioned upstream, an insulating solution discharge portion, which is an open portion of the insulating solution discharge line, is positioned downstream, and a UV lamp positioned downstream of the insulating solution discharge portion is further included.

In addition, the present invention provides a coating method using the dual slot die described above. In one embodiment, the coating method according to the present invention is a coating method of applying an electrode slurry and an insulating solution to a current collector sheet through a dual slot die including a lower block, an intermediate block, and an upper block, the method including forming an electrode slurry layer on a current collector sheet by branching and discharging the electrode slurry stored in a lower manifold positioned in the lower block in n lines by electrode slurry discharge lines formed in a lower shim, and forming an insulating layer on the current collector sheet by branching and discharging the insulating solution stored in an upper manifold positioned in the upper block in 2n lines by insulating solution discharge lines formed in an upper shim positioned between the upper block and the intermediate block, and n is an integer of 1 or more. For example, n is an integer ranging from 1 to 10, or from 1 to 5.

In a specific embodiment, the coating method according to the present invention includes applying an electrode slurry layer and an insulating layer formed on a current collector sheet to overlap each other, and the overlapping range can be performed in a range of 5% to 30% of the width of the insulating layer formed in the vertical direction of the current collector sheet. The overlapping range means a ratio of a region where the electrode slurry layer and the insulating solution layer overlap in the width direction based on 100% of the length in the width direction of the insulating layer.

In another specific example, in the coating method according to the present invention, the temperature $(T_1)$ of the insulating solution discharged by the insulating solution discharge lines may be in the range of 22° C. to 27° C., and the temperature $(T_2)$ of the slurry discharged by the electrode slurry discharge lines may be in the range of 20° C. to 25° C., the temperature $(T_1)$ of the insulating solution may be higher than the temperature $(T_2)$ of the electrode slurry, and the difference $(T_1-T_2)$ between the temperature $(T_1)$ of the insulating solution and the temperature $(T_2)$ of the electrode slurry may be in the range of 1° C. to 4° C.

In another example, the coating method according to the present invention may further include drying the electrode slurry applied on the current collector sheet after forming the insulating layer.

In another example, the coating method according to the present invention may further include a step of mixing a UV polymerization initiator with the insulating solution before the step of forming the insulating layer.

For example, the UV polymerization initiator is one or more of 2-hydroxy-2-methylpropiophenone (HMPP), 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2 phenyl-acetoxy-ethoxy]-ethyl ester, oxy-phenyl-acetic acid 2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, bis(2,4,6-trimethyl benzoyl)-phenyl phosphine oxide, bis(eta 5-2,4-cyclopentadien-1-yl), bis[2,6-difluoro-3-(1H-pyrrol-1-yl)phenyl]titanium, 4-isobutylphenyl-4'-methylphenyl iodonium, hexafluoro-phosphate, and methylbenzoylformate.

In another example, the method further includes s step of curing the insulating solution containing the UV polymerization initiator by irradiating the insulating solution containing the UV polymerization initiator applied on the current collector sheet with a UV light after forming the insulating layer.

Advantageous Effects

The present invention relates to a dual slot die and a coating method using the same, wherein there is the advantage that electrode slurry coating and insulating solution coating simultaneously proceed through a dual slot die to prevent the occurrence of electrode slurry sliding at the edge of the electrode slurry layer, and an electrode slurry layer and an insulating layer can be formed on a current collector sheet in a multi-line manner by including a shim having a structure formed with multiple discharge lines capable of discharging an electrode slurry or insulating solution in multiple lines, thereby increasing process efficiency.

BRIEF DESCRIPTION OF THE DRAWINGS

FIG. 1 is a schematic diagram illustrating the formation of an electrode slurry layer and an insulating layer on a current collector sheet through an independent electrode slurry coating slot die and an independent insulating solution coating slot die in a conventional manner.

FIG. 2 is a schematic diagram showing a dual slot die according to an embodiment of the present invention.

FIG. 3 is a schematic view illustrating the formation of an electrode slurry layer and an insulating layer on a current collector sheet through a dual slot die that is an enlarged representation of the area "A" of FIG. 2.

FIG. 4 is a schematic diagram illustrating an electrode slurry discharge portion and an insulating solution discharge portion positioned at the front end of a dual slot die according to a specific embodiment of the present invention.

FIG. 5 is a schematic diagram illustrating an electrode slurry discharge portion and an insulating solution discharge portion positioned at the front end of a dual slot die according to another specific embodiment of the present invention.

FIG. 6 is an exploded perspective view of a dual slot die according to another embodiment of the present invention.

FIG. 7 is a schematic view illustrating a state in which an electrode slurry layer and an insulating layer are formed on a current collector sheet using the dual slot die of FIG. 6.

FIG. 8 is an exploded perspective view of a dual slot die according to another embodiment of the present invention.

FIG. 9 is a schematic view illustrating a state in which an electrode slurry layer and an insulating layer are formed on a current collector sheet using the dual slot die of FIG. 8.

FIG. 10 is an exploded perspective view of a dual slot die including a UV lamp according to another embodiment of the present invention.

FIG. 11 is a schematic view illustrating a state in which an electrode slurry layer and an insulating layer are formed on a current collector sheet using the dual slot die of FIG. 10.

DETAILED DESCRIPTION OF THE PREFERRED EMBODIMENTS

Hereinafter, the present invention will be described in detail. Prior to this, the terms or words used in the specification and claims should not be interpreted as limited to conventional or dictionary meanings, and should be interpreted with a meaning and a concept that are consistent with the technical concept of the present invention based on the principle that the inventor may be appropriately define the concepts of the terms in order to explain his/her own invention in the best way.

The present invention provides a dual slot die. In one embodiment, a dual slot die according to the present invention includes a shim having a plurality of electrode slurry discharge lines capable of forming a multi-line of an electrode slurry layer and an insulating layer on one current collector sheet, and a shim having a plurality of insulating solution discharge lines.

The present invention is characterized in that the electrode slurry and the insulating solution are simultaneously coated on the current collector sheet by discharging the electrode slurry and the insulating solution from one slot die through the dual slot die. Through the dual slot die, by quickly coating the edge of the electrode slurry layer with the insulating solution to form the insulating layer before the sliding phenomenon of electrode slurry sliding occurs at the boundary of the layer of electrode slurry applied to the current collector sheet, it is possible to prevent unwanted sliding phenomena of electrode slurries and to improve the quality. It is also possible to prevent disconnection of current collector sheets and generation of a camber due to the separate positioning of an electrode slurry coating slot die and an insulating solution coating slot die as conventional. Furthermore, in the present invention, the production efficiency can be improved by forming a multi-line coating layer of the electrode slurry and the insulating solution on one current collector sheet by including a shim having a plurality of electrode slurry discharge lines and a shim that has a plurality of insulating solution discharge lines in a dual slot die.

In one embodiment, a dual slot die according to the present invention includes a lower block, an intermediate block, and an upper block, the dual slot die including a lower shim located between the lower block and the intermediate block, an upper shim located between the intermediate block and the upper block, a lower manifold formed in the lower block to store the electrode slurry and an upper manifold formed in the upper block to store the insulating solution.

In addition, the dual slot die has a structure in which the electrode slurry stored in the lower manifold is branched and discharged in n lines by the electrode slurry discharge lines formed in the lower shim, and the insulating solution stored in the upper manifold is branched and discharged in 2n lines by the insulating solution discharge lines formed in the upper shim, and in this case, n is an integer of 1 or more. For example, n is an integer ranging from 1 to 10 or from 1 to 5.

The lower block, the intermediate block, and the upper block may be in one of the conventional forms. In addition, the upper manifold and the lower manifold may also be in one of the conventional forms.

The lower shim positioned between the lower block and the intermediate block includes a discharge line for discharging the electrode slurry stored in the lower manifold, and in this case, a plurality of discharge lines may be formed. Meanwhile, the upper shim positioned between the intermediate block and the upper block includes a discharge line for discharging the insulating solution stored in the upper manifold, and in this case, a plurality of discharge lines may also be formed. Since insulating layers should be formed on the left and right edges of the electrode slurry layer formed on the current collector sheet, the number of discharge lines for discharging the insulating solution may be twice the number of discharge lines for discharging the electrode slurry. Accordingly, the dual slot die has a structure in which the electrode slurry stored in the lower manifold is branched and discharged in n lines by the electrode slurry discharge lines formed in the lower shim, and the insulating solution stored in the upper manifold is branched and discharged in 2n lines by the insulating solution discharge lines formed in the upper shim, and in this case, n is an integer of 1 or more.

Specifically, the lower shim may have a structure having an electrode slurry discharge line for discharging the electrode slurry stored in the lower manifold in a vertical direction of the cross-section of the lower shim, and an electrode slurry discharge portion which is an open portion of the electrode slurry discharge line. Meanwhile, the upper shim may have a structure having an insulating solution discharge line for discharging the insulating solution stored in the upper manifold in a vertical direction of the cross-section of the upper shim, and an insulating solution discharge portion which is an open portion of the insulating solution discharge line. Further, the upper shim and the lower shim may have a structure in which all sides are closed except for the electrode slurry discharge portion and the insulating solution discharge portion, respectively. In this case, the electrode slurry discharge line may have a shape that becomes narrower toward the electrode slurry discharge portion. This allows the electrode slurry supplied from the lower manifold to be received in a wide width, and in order to finely adjust an electrode slurry discharged through the electrode slurry discharge portion, the width of an electrode slurry discharge line can be formed to be narrower as it approaches the electrode slurry discharge portion. In this case, the width of the insulating solution discharge line may be narrower as the insulating solution discharge line also approaches the insulating solution discharge portion.

In a specific embodiment, an angle at which the first plane extending the upper shim and the second plane extending the lower shim intersect forms an angle in the range of 20° to 60°. Specifically, the angle at which the first plane extending the upper shim and the second plane extending the lower shim intersect may be in the range of 20° to 45°, in the range of 20° to 35°, in the range of 25° to 50°, or in the range of 25° to 40°. This may correspond to the formation angle of the front end of the intermediate block in the vertical direction of the side portion of the dual slot die. When the upper shim and the lower shim are extended based on the cross-section, they may intersect each other in one place, and the insulating solution discharge portion and the electrode slurry discharge portion may be adjacent to each other in the vicinity of the point of intersection. Accordingly, the discharge points of the electrode slurry and the insulating solution may be concentrated in approximately one place. When the angle of intersection between the extension planes of the upper shim and the lower shim is less than 20°, when an electrode slurry discharged through the electrode slurry discharge portion of the lower shim collides with the surface of the current collector sheet, the flow of the electrode slurry becomes instantaneously strong in the direction opposite to the direction of rotation of the coating roll, which may cause a leaking phenomenon. On the other hand, when the angle of intersection of the extension planes of the upper shim and the lower shim exceeds 60°, the flow of the electrode slurry discharged through the electrode slurry discharge line becomes difficult, and a high pressure may be required for smooth flow.

In the present invention, the first plane extending the upper shim corresponds to the insulating solution discharge line through which the insulating solution is discharged. In addition, the second plane extending the lower shim corresponds to the electrode slurry discharge line through which the electrode slurry is discharged.

In the present invention, the first plane extending the upper shim may form an angle close to perpendicular to the current collector sheet through which the insulating solution is discharged. For example, the first plane extending the upper shim forms an angle in a range of 75° to 115°, a range of 80° to 100°, or a range of 85° to 95° with the current collector sheet. In addition, the second plane extending the lower shim forms a constant inclination angle with the current collector sheet through which the electrode slurry is discharged. In the present invention, the electrode slurry is discharged obliquely with respect to the current collector sheet, and the insulating solution is discharged perpendicularly to the current collector sheet. Through this, the present invention can increase the uniformity of coating the insulating solution while stably discharging the electrode slurry on the current collector sheet.

In another specific embodiment, the dual slot die according to the present invention may have a structure in which the width of the electrode slurry discharge portion, which is an open portion of the electrode slurry discharge line, and the width of the insulating solution discharge portion, which is an open portion of the insulating solution discharge line, do not overlap each other in the vertical direction of the cross-section of the upper shim.

When having such a structure, the electrode slurry layer may naturally slide due to gravity so that a gap between the electrode slurry layer and the insulating layer formed on the current collector sheet immediately after the electrode slurry and insulating solution coating process may be filled by the sliding electrode slurry. Even when there is still a gap, the electrode slurry layer and the insulating layer are compressed by rolling during the rolling process after the coating process, so that the electrode slurry layer and the insulating layer can overlap, so that the void can be filled, so a uniform electrode slurry layer and insulating layer may be formed. Meanwhile, it is preferable to set an appropriate distance so that the width of the electrode slurry discharge portion and the width of the insulating solution discharge portion do not overlap each other in consideration of both the sliding phenomenon of the electrode slurry and the rolling process.

In another specific embodiment, the dual slot die according to the present invention may have a structure in which the width of the electrode slurry discharge portion, which is an open portion of the electrode slurry discharge line, and the width of the insulating solution discharge portion, which is an open portion of the insulating solution discharge line, do overlap each other in the vertical direction of the cross-section of the upper shim, and the overlapping range is 5% to 30% of the width of the insulating layer formed in the vertical direction of the current collector sheet. Specifically, the overlapping range is in the range of 5% to 20%, 10% to 30%, or 5% to 10% of the width of the insulating solution discharge portion. In order to prevent the electrode slurry layer formed on the current collector sheet from coming into contact with the insulating layer, this structure has a structure in which the width of the electrode slurry discharge portion is overlapped with the width of the insulating solution discharge portion at a certain interval, so that the electrode slurry layer and the insulating layers sufficiently overlap, and thus it is possible to prevent the occurrence of a gap between an insulating layer of the current collector sheet and an electrode slurry layer. At this time, when the overlapping range is too small as compared with the width of the insulating solution discharge portion, the insulating layer may not sufficiently overlap the electrode slurry layer, and when it is too large, there may be a problem that the extent to which the insulating layer overlaps the electrode slurry layer is wide, and the thickness of the coating layer in the overlapping region becomes too thick, and the overall thickness of the electrode slurry layer and the insulating layer become uneven.

In another specific embodiment, the insulating layer may be coated to a thickness of 5% to 50% of the thickness of the electrode slurry layer, for example, 1 μm to 100 μm. Meanwhile, the thickness of the positive electrode slurry layer may be 30 μm to 400 μm, preferably 50 μm to 110 μm. In the case of the thickness range of the insulating layer, the thickness of the lithium secondary battery may be reduced by forming an insulating layer having an appropriate strength. On the other hand, when the coating thickness of the insulating layer is too thin, it may be difficult to obtain desired electrical insulation, and when it is too thick, there is a problem in that the coating layer solidification time becomes long or the thickness increases.

Meanwhile, the width and length of the insulating layer may be 1 mm to 10 mm, but may be changed depending on the purpose, and thus is not necessarily limited thereto.

Meanwhile, the insulating layer may be a porous polymer film including a plurality of pores. This prevents a short circuit between the positive electrode and the negative electrode while allowing the electrolyte to pass therethrough, thereby providing a passage through which lithium ions included in the lithium secondary battery can actively move. Accordingly, the insulating layer may function as a separator included in a typical lithium secondary battery.

In another embodiment, the electrode slurry discharge portion, which is an open portion of the electrode slurry discharge line, is located upstream in the direction in which the electrode slurry and the insulating solution are applied onto the current collector sheet, and the insulating solution discharge portion, which is the open portion of the insulating solution discharge line, is located downstream, and may further include a UV lamp located downstream of the insulating solution discharge portion. It means that the electrode slurry discharge portion positioned upstream is disposed closer to the ground than the insulating solution discharge portion, and the insulating solution discharge portion is disposed closer to the ground than the UV lamp.

The UV lamp is a device that emits a UV (ultra violet) light source that causes a photo-curing action through a UV photo-initiator. This makes it possible to rapidly cure an insulating solution containing the UV polymerization initiator by adding the above-mentioned UV-polymerization initiator to an insulating solution, and then irradiating a UV light through a UV lamp immediately after applying the insulating solution containing the ultraviolet polymerization initiator to the current collector sheet. The insulating solution containing the cured UV polymerization initiator serves as a wall or barricade in the outer portion of the electrode slurry layer to quickly prevent the sliding phenomenon of the layer of electrode slurry, thereby improving the uniformity of the coating layer formed on the current collector sheet. Meanwhile, the UV lamp may be any one of conventional UV lamps that can be appropriately selected by those skilled in the art, and its form is not particularly limited.

In addition, in addition to the UV lamp, a lamp capable of irradiating other light sources such as X-rays and electron beams or a heating device irradiating heat may be used. The lamp capable of irradiating other light sources such as X-rays and electron beams may cure an insulating solution containing the light source polymerization initiator, and the heating device may cure an insulating solution containing the thermal polymerization initiator by supplying heat to the insulating solution. The lamp and the heating device capable of irradiating other light sources such as X-rays and electron beams may be any one of conventional devices, and are not particularly limited.

In addition, the present invention provides a coating method using the dual slot die described above. Content common to the above-described dual slot die may be included, and some of the common content may be omitted.

In one embodiment, the coating method using a dual slot die according to the present invention is a coating method of applying an electrode slurry and an insulating solution to a current collector sheet through a dual slot die including a lower block, an intermediate block, and an upper block, the method including forming an electrode slurry layer on a current collector sheet by branching and discharging the electrode slurry stored in the lower manifold positioned in the lower block in n lines by the electrode slurry discharge lines formed in the lower block, and forming an insulating layer on the current collector sheet by branching and discharging the insulating solution stored in the upper manifold positioned in the upper block in 2n lines by the insulating solution discharge lines formed in the upper shim positioned between the upper block and the intermediate block, and n is an integer of 1 or more. Specifically, n is an integer ranging from 1 to 10, or an integer ranging from 1 to 5.

As described above, the present invention can form a line in which the electrode slurry stored in one lower manifold discharges n branched electrode slurry lines through n electrode slurry discharge lines of the lower shims to form n layers of electrode slurry on the current collector sheet. Similarly, the insulating solution stored in the upper manifold can form a line for forming 2n insulating layers on the current collector sheet by discharging 2n branched insulating solution lines through 2n insulating solution discharge lines of the upper shim. That is, the electrode slurry layer can be formed in several lines of electrode slurry on a current collector sheet through discharge lines in which the electrode slurry stored in one lower manifold branches into several branches of the lower shim, and at the same time, an insulating solution stored in one upper manifold can form an insulating layer in several lines of insulating solution on the current collector sheets through the discharge lines branched into several branches of the upper shims to improve manufacturing efficiency.

In addition, as described above, the dual slot die of the present invention has a structure including a lower shim located between the lower block and the intermediate block and an upper shim located between the intermediate block and the upper block, and the structure can prevent the sliding phenomenon of the electrode slurry by simultaneously applying the insulating solution to the current collector sheet through the electrode slurry discharge line formed in the lower shim and through the insulating solution discharge line provided in the upper shim.

In a specific embodiment, the coating method using a dual slot die according to the present invention includes applying an electrode slurry layer and an insulating layer formed on a current collector sheet to overlap each other, and the overlapping range can be coated in a range of 5% to 30% of the width of the insulating layer formed in the vertical direction of the current collector sheet. Specifically, the overlapping range is in the range of 5% to 20%, 10% to 30%, or 5% to 10% of the width of the insulating solution discharge portion.

This can sufficiently overlap the insulating layer on the electrode slurry layer, thereby preventing the occurrence of a gap between the insulating layer of the current collector sheet and the electrode slurry layer. At this time, when the overlapping range is too small as compared with the width of the insulating layer, the insulating layer may not sufficiently overlap the electrode slurry layer, and when it is too large, there may occur a problem that the extent in which the insulating layer overlaps the electrode slurry layer is wide, and the thickness of the coating layer in the overlapping region becomes thick, and the overall thickness of the electrode slurry layer and the insulating layer becomes uneven.

In another specific embodiment, in the coating method using a dual slot die according to the present invention, the temperature ($T_1$) of the insulating solution discharged by the insulating solution discharge line may be in the range of 22° C. to 27° C., and the temperature ($T_2$) of the slurry discharged by the electrode slurry discharge line may be in the range of 20° C. to 25° C., the temperature ($T_1$) of the insulating solution may be higher than the temperature ($T_2$) of the electrode slurry, and the difference ($T_1$-$T_2$) between the temperature ($T_1$) of the insulating solution and the temperature ($T_2$) of the electrode slurry may be in the range of 1° C. to 4° C.

The electrode slurry generally has a lower viscosity than the insulating solution, so that after being coated on the current collector sheet, a sliding phenomenon in which the electrode slurry flows down occurs at the edge of the electrode slurry layer. On the other hand, since the insulating solution has a higher viscosity than the electrode slurry, the sliding phenomenon at the edge of the insulating layer after being coated on the current collector sheet may occur less than that of the electrode slurry layer. Meanwhile, the insulating solution having a high viscosity may have reduced fluidity through the insulating solution discharge line. Accordingly, the temperature ($T_1$) of the insulating solution is higher than the temperature ($T_2$) of the electrode slurry, thereby increasing the fluidity of the insulating solution and preventing the electrode slurry layer from sliding. At this time, the temperature ($T_1$) of the insulating solution discharged by the insulating solution discharge line is in the range of 22° C. to 27° C., and the temperature ($T_2$) of the slurry discharged by the electrode slurry discharge line is in the range of 20° C. to 25° C., and the difference ($T_1$-$T_2$) between the temperature ($T_1$) of the insulating solution and the temperature ($T_2$) of the electrode slurry may be controlled in a range of 1° C. to 4° C. The temperature ($T_1$) of the insulating solution and the temperature ($T_2$) of the electrode slurry may typically be the temperature of the insulating solution and the temperature of the electrode slurry in the coating process, but may be appropriately changed depending on the ambient temperature, so it is not necessarily limited thereto. However, as described above, it is desirable that the difference ($T_1$-$T_2$) between the temperature ($T_1$) of the insulating solution and the temperature ($T_2$) of the electrode slurry is controlled in the range of 1° C. to 4° C. to control the fluidity of the insulating solution and the fluidity of the electrode slurry to create optimal coating conditions. Meanwhile, when the difference ($T_1$-$T_2$) between the temperature ($T_1$) of the insulating solution and the temperature ($T_2$) of the electrode slurry is less than 1° C., the desired purpose of controlling the fluidity of the electrode slurry and the insulating solution may not be achieved.

On the other hand, when the temperature exceeds 4° C., the fluidity of the insulating solution is excessively increased, which may cause sliding of the insulating layer, and the fluidity of the electrode slurry may decrease, so that a uniform electrode slurry layer may not be formed.

In another example, the coating method using a dual slot die according to the present invention may further include drying the electrode slurry applied on the current collector sheet after forming the insulating layer. In this case, as the drying method, moisture may be removed by completely drying the electrode slurry by a drying method commonly known in the art. Drying may be applied by changing a hot air method, a direct heating method, an induction heating method, etc. at a temperature at which all moisture is volatilized, but is not limited thereto.

In another example, the coating method using a dual slot die according to the present invention may further include a step of mixing a UV polymerization initiator with the insulating solution before the step of forming the insulating layer. This may induce curing of the insulating layer including the polymerization initiator by irradiating a UV light to the insulating layer including the UV polymerization initiator, as will be described later.

Specifically, the UV polymerization initiator may include one or more of 2-hydroxy-2-methylpropiophenone (HMPP), 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2 phenyl-acetoxy-ethoxy]-ethyl ester, oxy-phenyl-acetic acid 2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, bis(2,4,6-trimethyl benzoyl)-phenyl phosphine oxide, bis(eta 5-2,4-cyclopentadien-1-yl), bis[2,6-difluoro-3-(1H-pyrrol-1-yl)phenyl]titanium, 4-isobutylphenyl-4'-methylphenyl iodonium, hexafluorophosphate, and methylbenzoylformate, and in addition to the UV polymerization initiator described above, conventional UV polymerization initiators that can be easily used by those skilled in the art can also be included.

In another example, the coating method using a dual slot die according to the present invention may further include curing the insulating solution containing the UV polymerization initiator by irradiating the insulating solution containing the UV polymerization initiator applied on the current collector sheet with a UV light after forming the insulating layer.

In this case, the insulating solution containing the UV polymerization initiator may be a UV curable material. Specifically, the UV curable material may include an insulating polymer resin that is a UV curable polymer. In the present invention which requires curing the insulating polymer resin to form an insulating layer, a resin with a short curing time and a simple curing method is preferred, therefore, one or more of a UV curable silicone resin, a UV curable acrylic resin, and a UV curable epoxy resin and a UV curable urethane resin can be used, which may be easily cured with only irradiating UV light. The UV-curable urethane resin may include a urethane acrylate, and the UV-curable epoxy resin may include an epoxy acrylate.

As described above, an insulating solution containing a UV polymerization initiator is applied to the current collector sheet, and the insulating layer including the UV polymerization initiator can be rapidly cured by irradiating a UV light. The insulating layer including the cured UV polymerization initiator is stronger than the insulating layer before curing, so that it can simultaneously serve as a guide layer to prevent being pushed by the electrode slurry layer during a subsequent rolling process. In addition, the sliding phenomenon of the electrode slurry layer can be minimized by rapidly curing the insulating layer including the UV polymerization initiator.

Meanwhile, in addition to the UV polymerization initiator, a light source polymerization initiator that induces polymerization by other light sources such as X-rays and electron beams in addition to the UV light may be included. In addition, it is possible to induce polymerization by supplying heat using a thermal polymerization initiator. Meanwhile, it is preferable to use an insulating solution containing a curable resin cured by heat or a light source such as X-rays or an electron beam. At this time, the curable resin cured by a light source such as X-rays or an electron beam is preferably one or more of a silicone resin, an acrylic resin, an epoxy resin, and a urethane resin that is cured by a light source such as X-rays or an electron beam or cured by heat. In addition, as the curable resin cured by heat, one or more selected from modified polypropylene, a polypropylene-butylene-ethylene terpolymer, an acrylic resin and a silicone resin, etc. may be used, and the modified polypropylene may be casted polypropylene (CPP).

In another example, the coating method using a dual slot die according to the present invention, after forming the insulating layer, may further include the step of forming a stability-reinforcing layer on the insulating layer. The stability-reinforcing layer is a mixture including an inorganic oxide, and is formed on the insulating layer to improve the mechanical strength of the insulating layer, and also to improve stability against heat shrinkage.

The inorganic oxide may be one or more selected from the group consisting of $Al_2O_3$, $BaTiO_3$, CaO, $CeO_2$, NiO, MgO, $SiO_2$, $SnO_2$, $SrTiO_3$, $TiO_2$, $Y_2O_3$, ZnO, $ZrO_2$, $Pb(Zr,Ti)O_3$ (PZT), $(Pb,La)(Zr,Ti)O_3$(PLZT), $PB(Mg_3Nb_{2/3})O_3$—$PbTiO_3$(PMN-PT) and hafnia ($HfO_2$), and specifically may be one or more selected from the group consisting of $Al_2O_3$, $SiO_2$, $Y_2O_3$ and $ZrO_2$.

In this case, the inorganic oxide may have a particle shape and an average particle diameter may be 1 nm to 10 μm, specifically 0.01 μm to 7 μm, and more specifically 0.1 μm to 5 μm. When the average particle diameter of the inorganic oxide is 1 nm or more, suitable dispersibility can be exhibited to prevent the inorganic oxide from interfering with the movement of lithium ions, and when it is 10 μm or less, the thickness of the entire electrode can be maintained within an appropriate range by preventing the stability-reinforcing layer from becoming too thick.

The mixture including the inorganic oxide may further include a binder material, and the inorganic oxide and the binder material may be mixed in a weight ratio of 99:1 to 80:20, specifically 95:5 to 90:10. By including the binder material in the mixture including the inorganic oxide, the inorganic oxide may be firmly bonded to the insulating layer.

The binder material may be one or more selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinylpyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile styrene-butadiene copolymer, polyimide, and styrene-butadiene rubber (SBR).

The stability-reinforcing layer may have a thickness of 0.1 μm to 30 μm, specifically, may have a thickness of 1 μm to 20 μm, and more specifically, may have a thickness of 2 μm to 10 μm. When the thickness of the stability-reinforcing layer is 0.1 μm or more, the stability-reinforcing layer exhibits an appropriate level of strength, while improving the mechanical strength of the insulating layer and improving the stability against heat shrinkage, when the thickness of the stability-reinforcing layer is 30 μm or less, the total thickness of an electrode can be reduced to achieve a reduction in thickness of a lithium secondary battery including the electrode.

Meanwhile, the insulating material that is the main component of the insulating solution, may include any one selected from the group consisting of butyl acrylate, styrene, acrylic acid, hydroethyl acrylate and styrene-butadiene rubber (SBR) or a mixture of two or more thereof. The insulating material may be an aqueous solution dispersed in water in an amount of 10 wt % to 90 wt %.

In addition, the polymer material contained in the insulating solution may be one or more selected from the group consisting of polyolefins such as polyethylene and polypropylene, polyesters such as polyethylene terephthalate and polybutylene terephthalate, polyamides such as aramid, polyacetal, polycarbonate, polyimide, polyetherketone, polyethersulfone, polyphenylene oxide, polyphenylene sulfide, polyethylene naphthalene, polytetrafluoroethylene, polyvinylidene fluoride, polyvinyl chloride, polyacrylonitrile, cellulose, nylon, polyparaphenylene benzobisoxazole, and polyarylate, specifically, may be a polyolefin, more specifically, and may be one or more selected from the group consisting of polyethylene, polypropylene, polybutylene and polystyrene.

The mixture including the polymer may further include a binder material, and the polymer and the binder material may be mixed in a weight ratio of 99:1 to 80:20, specifically 95:5 to 90:10. By including the binder material in the mixture containing the polymer, the polymer can be more firmly bonded to the active material layer.

The binder material may be one or more selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinylpyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile styrene-butadiene copolymer, polyimide, and styrene-butadiene rubber (SBR).

Meanwhile, the electrode slurry collectively refers to a composition in a slurry state including an electrode active material. The current collector sheet refers to a positive electrode current collector sheet, wherein the positive electrode refers to a positive electrode for a secondary battery, and specifically refers to a positive electrode for a lithium secondary battery.

The positive electrode has a structure in which a positive electrode active material layer having a two-layer structure is laminated on a positive electrode current collector. In one example, the positive electrode active material layer includes a positive electrode active material, a conductive material, a binder polymer, and the like, and when necessary, may further include a positive electrode additive commonly used in the art.

The positive electrode active material may be a lithium-containing oxide, and may be the same or different. As the lithium-containing oxide, a lithium-containing transition metal oxide may be used.

For example, lithium-containing transition metal oxides may be any one or a mixture of two or more thereof selected from the group consisting of $Li_xCoO_2$(0.5<x<1.3), $Li_xNiO_2$ (0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$(0.5<x<1.3, 0<y<1), $Li_xCo_{1-y}Mn_yO_2$ (0.5<x<1.3, 0<y<1), $Li_xNi_{1-y}Mn_yO_2$(0.5<x<1.3, 0<y<1), $Li_x$ $(Ni_aCo_bMn_c)O_4$(0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$ (0.5<x<1.3, 0<z<2), $Li_xCoPO_4$(0.5<x<1.3) and $Li_xFePO_4$ (0.5<x<1.3). In addition, the lithium-containing transition metal oxide may be coated with a metal such as aluminum (Al) or a metal oxide. In addition, in addition to the lithium-containing transition metal oxide, one or more of sulfides, selenides, and halides may be used.

The positive active material may be included in an amount of 94.0 to 98.5 wt % in the positive active material layer. When the content of the positive electrode active material satisfies the above range, it is advantageous in terms of manufacturing a high capacity battery and providing sufficient positive electrode conductivity or adhesion between electrode materials.

The current collector used for the positive electrode is a metal with high conductivity, and any metal that can be easily adhered to the positive electrode active material slurry may be used as long as it does not have reactivity in the voltage range of the electrochemical device. Specifically, non-limiting examples of the current collector for the positive electrode include a foil made of aluminum, nickel, or a combination thereof. The positive electrode active material layer further includes a conductive material.

A carbon-based conductive material is often used as the conductive material, and includes a sphere type or a needle type carbon-based conductive material. The sphere type carbon-based conductive material fills pores that are voids between the particles of the active material in a mixed state with the binder to improve physical contact between the active materials, thereby reducing the interfacial resistance and improving the adhesion between the lower positive electrode active material and the current collector.

Examples of the sphere type carbon-based conductive material include carbon black including Denka Black, and examples thereof include FX35 (Denka Corporation), SB50L (Denka Corporation), and Super-P, but are not limited thereto. Here, 'sphere type' means having a spherical particle shape and having an average diameter (D50) of 10 to 500 nm, specifically, 15 to 100 nm or 15 to 40 nm.

As a meaning corresponding to the sphere type carbon-based conductive material, there is a needle type carbon-based conductive material. The sphere type carbon-based conductive material may be a carbon nanotube (CNT), vapor-grown carbon fiber (VGCF), carbon nanofiber (CNF), or a mixture of two or more thereof. Here, 'needle type' means a needle-like particle shape, such as an aspect ratio (value of length/diameter) in the range of 50 to 650, specifically 60 to 300 or 100 to 300.

The sphere type carbon-based conductive material has an advantage in that dispersion is advantageous compared to the needle type conductive material, and has an effect of improving the insulating properties of the corresponding layer due to lower electrical conductivity compared to the needle type carbon-based conductive material.

The conductive material may be generally contained at 0.5 to 5 wt % with respect to the total weight of the positive electrode active material layer. When the content of the conductive material satisfies the above range, there is an effect of providing sufficient conductivity of the positive electrode and lowering the interfacial resistance between the current collector and the active material.

As the binder polymer, binders commonly used in the art may be used without limitation. For example, when the binder is soluble in an organic solvent and insoluble in water, a water-insoluble polymer or a water-soluble polymer insoluble in an organic solvent and soluble in water may be used. Examples of the water-insoluble polymer may be one or more selected from the group consisting of polyvinylidene fluoride (PVDF), polyvinylidene chloride (PVDC), polyacrylonitrile (PAN), polypropylene oxide (PPO), a polyethylene oxide-propylene oxide copolymer (PEO-PPO), polytetrafluoroethylene (PTFE), polyimide (PI), polyetherimide (PEI), styrene butadiene rubber (SBR), polyacrylate, and derivatives thereof.

The water-soluble polymer may be one or more selected from various cellulose derivatives such as carboxymethyl-cellulose (CMC), methylcellulose (MC), cellulose acetate phthalate (CAP), hydroxypropylmethylcellulose (HPMC), and hydroxypropylmethylcellulose phthalate (HPMCP).

The content of the binder polymer is proportional to the content of the conductive material included in the upper positive electrode active material layer and the lower positive electrode active material layer. This is because, in order to impart adhesion to a conductive material having a relatively small particle size compared to the active material, more binder polymer is required when the conductive material content increases, and less binder polymer can be used when the conductive material content decreases.

DETAILED DESCRIPTION OF THE PREFERRED EMBODIMENTS

Hereinafter, the present invention will be described in more detail with reference to the drawings. While the invention is susceptible to various modifications and forms, specific embodiments are illustrated in the drawings and described in detail herein. However, this is not intended to limit the present invention to specific embodiments, and it should be understood to include all modifications, equivalents and substitutes included in the spirit and scope of the present invention.

First Embodiment

FIG. 2 is a schematic diagram showing a dual slot die 200 according to an embodiment of the present invention; referring to FIG. 2, the dual slot die 200 according to the present invention includes a lower block 12, an intermediate block 11 and an upper block 10; a lower shim 21 positioned between a lower block 12 and an intermediate block 11 and a lower spacer 23; and an upper shim 20 positioned between an intermediate block 11 and an upper block 10 and an upper spacer 22. In addition, it may be a structure including a lower manifold 14 formed in the lower block 12 and storing the electrode slurry 30, and an upper manifold 13 formed in an upper block 10 and storing an insulating solution 31, wherein the electrodes slurry 30 stored in the lower manifold 14 is branched and discharged by an electrode slurry discharge line 25 formed in the lower shim 21, and the insulating solution 31 stored in the upper manifold 13 is branched and discharged by an insulating solution discharge line 27 formed in the upper shim 20.

FIG. 3 is a schematic view illustrating the formation of an electrode slurry layer 32 and an insulating layer 33 on a current collector sheet 16 through a dual slot die 200 that is an enlarged representation of the area "A" of FIG. 2.

Referring to FIG. 3, the electrode slurry 30 discharged through an electrode slurry discharge portion 26 formed in the lower shim 21 may be coated on the current collector sheet 16 moving along the rotation direction of the coating roll 15, and then immediately thereafter, the insulating solution 31 discharged through an insulating solution discharge portion 28 formed in an upper shim 20 may be applied onto the current collector sheet 16. As a result, the electrode slurry 30 and the insulating solution 31 are simultaneously coated to prevent sliding of the electrode slurry 30 at the edge of the electrode slurry layer 32.

In addition, the angle θ formed by the upper shim 20 and the lower shim, which is an angle at which the first plane extending the upper shim 20 and the second plane extending the lower shim 21 intersect, is approximately 25°. Here, the upper shim 20 forms an angle perpendicular to the current collector sheet 16 moving on the coating roll 15, and the lower shim 21 forms an angle of 65° with the current collector sheet 16. By forming such a discharge angle, the present invention can uniformly coat the insulating solution 31 while stably forming the electrode slurry layer 32.

Second Embodiment

FIG. 4 is a schematic diagram illustrating an electrode slurry discharge portion 26 and an insulating solution discharge portion 28 positioned at the front end of a dual slot die 200 according to another specific embodiment of the present invention. Referring to FIG. 4, the electrode slurry discharge portion 26 of a lower shim 21 positioned between a lower block 12 and an intermediate block 11 and the insulating solution discharge portion 28 of an upper shim 20 positioned between the intermediate block 11 and an upper block 10 do not overlap each other.

In the case of having such a structure, when the electrode slurry 30 and the insulating solution 31 are coated on the current collector sheet 16, a gap may occur between the electrode slurry layer 32 and the insulating layer 33. However, since the electrode slurry layer 32 may naturally slide due to gravity, the gap between electrode slurry layer 32 and insulating layer 33 formed immediately after the electrode slurry 30 and insulating solution 31 coating process naturally causes a sliding phenomenon of the edge of electrode slurry layer 32 by gravity over time, and the gap may be filled by the sliding electrode slurry 30. Even when there is still a gap, the electrode slurry layer 32 and the insulating layer 33 are compressed by rolling during the rolling process after the coating process, so that the electrode slurry layer 32 and the insulating layer 33 can overlap, so that the gap can be filled, resulting in a uniform electrode slurry layer 32 and insulating layer 33 may be formed. In consideration of this, the width of the electrode slurry discharge portion 26 and the width of the insulating solution discharge portion 28 may be set so as not to overlap each other as much as an appropriate distance (a).

Third Embodiment

FIG. 5 is a schematic diagram illustrating an electrode slurry discharge portion 26 and an insulating solution discharge portion 28 positioned at the front end of a dual slot die 200 according to another specific embodiment of the present invention. Referring to FIG. 5, the electrode slurry discharge portion 26 of a lower shim 21 positioned between a lower block 12 and an intermediate block 11 and the insulating solution discharge portion 28 of an upper shim 20 positioned between the intermediate block 11 and an upper block 10 overlap each other, and this structure shows that the overlap in the range of about 10% (b) with respect to the width of the discharge portion.

When having such a structure, it is possible to sufficiently overlap the electrode slurry layer 32 and the insulating layer 33 formed on the current collector sheet 16 to prevent the occurrence of a gap between the insulating layer 33 and the electrode slurry layer 32 of the current collector sheet 16.

Fourth Embodiment

FIG. 6 is an exploded perspective view of a dual slot die 200 according to another embodiment of the present invention. FIG. 7 is a schematic view illustrating a state in which an electrode slurry layer 32 and an insulating layer 33 are formed on a current collector sheet 16 using the dual slot die 200 of FIG. 6.

Referring to FIG. 6, the dual slot die 200 includes a lower block 12, an intermediate block 11 and an upper block 10; and a lower shim 21 positioned between the lower block 12 and the intermediate block 11 and an upper shim 20 positioned between the intermediate block 11 and the upper block 10.

The lower shim 21 has a structure including two electrode slurry discharge lines 25 and two electrode slurries discharge portions 26, and the upper shim 20 has a structure including four insulating solution discharge lines 27 and four insulating solution discharge portions 28. Meanwhile, the electrode slurry discharge line 25 and the insulating solution discharge line 27 may have a shape in which the width and length of each discharge line decrease in the direction toward the electrode slurry discharge portion 26 and the direction toward the insulating solution discharge portion 28, respectively. This maximizes the receiving area of the electrode slurry 30 flowing in from the lower manifold 14, and the electrode slurry 30 that is accommodated and flows through the electrode slurry discharge line 25 is discharged through the electrode slurry discharge portion 26 of which the width is narrowed, and the electrode slurry layer 32 having a fine width may be formed on the current collector sheet 16. This is also the same for the insulating solution discharge line 27.

Referring to FIG. 7, the electrode slurry 30 may be applied in two lines to the current collector sheet 16 through a dual slot die including a lower shim 21 in which two electrode slurry discharge lines 25 and two electrodes slurry discharge portions 26 are formed and an upper shim 20 in which four insulating solution discharge lines 27 and four insulation solution discharge portions 28 are formed, and the insulating solution 31 is applied to the left and right edges of each electrode slurry layer 32 to form the insulating layer 33 in a total of four lines.

In this structure, the electrode slurry 30 stored in one lower manifold 14 and the insulating solution 31 stored in the upper manifold 13 are branched into several branches and discharged through the lower shim 21 and the upper shim 20 each having a plurality of discharge lines, respectively, and then coated in a multi-line manner on the current collector sheet 16, thereby enhancing manufacturing efficiency.

Fifth Embodiment

FIG. 8 is an exploded perspective view of a dual slot die 200 according to another embodiment of the present invention. FIG. 9 is a schematic view illustrating a state in which an electrode slurry layer 32 and an insulating layer 33 are formed on a current collector sheet 16 using the dual slot die 200 of FIG. 8.

Referring to FIG. 8, the lower shim 21 has a structure including four electrode slurry discharge lines 25 and four electrode slurries discharge portions 26, and the upper shim 20 has a structure including eight insulating solution discharge lines 27 and eight insulating solution discharge portions 28.

Referring to FIG. 9, the electrode slurry 30 may be applied in four lines to the current collector sheet 16 through a dual slot die including a lower shim 21 in which four electrode slurry discharge lines 25 and four electrodes slurry discharge portions 26 are formed and an upper shim 20 in which eight insulating solution discharge lines 27 and eight insulation solution discharge portions 28 are formed, and the insulating solution 31 is applied to the left and right edges of each electrode slurry layer 32 to form the insulating layer 33 in a total of eight lines.

In this structure, the electrode slurry 30 stored in one lower manifold 14 and the insulating solution 31 stored in the upper manifold 13 are branched into several branches and discharged through the lower shim 21 and the upper shim 20 each having a plurality of discharge lines, respectively, and then coated in a multi-line manner on the current collector sheet 16, thereby enhancing manufacturing efficiency.

Sixth Embodiment

FIG. 10 is an exploded perspective view of a dual slot die 200 including a UV lamp 40 according to another embodiment of the present invention. FIG. 11 is a schematic view illustrating a state in which an electrode slurry layer and an insulating layer are formed on a current collector sheet 16 using the dual slot die 200 of FIG. 10.

Referring to FIG. 10, the structure includes all the components of the dual slot die 200 of FIG. 6, and further includes a UV lamp 40 on the upper block 10. At this time, when the UV polymerization initiator is added to the insulating solution 31 and introduced into the upper manifold 13, and after an insulating solution containing the UV-polymerization initiator is applied to the current collector sheet 16 through the insulating solution discharge line 27 of the upper shim 20, the UV light emitted from the UV lamp 40 is irradiated onto the insulating layers 34 containing the ultraviolet polymerization initiator, and the insulating layers 34 including the UV polymerizable initiator can be cured to form insulating layers 35 containing the finally cured UV polymerization initiator.

The insulating solution containing the UV polymerization initiator is reacted with the UV light to solidify the cured insulating solution, which is firmly hardened between a few seconds and a few minutes, so that the occurrence of sliding of the electrode slurry 30 generated at the edge of the electrode slurry layer can be prevented rapidly and efficiently. Through this, an electrode slurry layer having a uniform thickness may be formed.

DESCRIPTION OF MARKS IN THE FIGURES

10: Upper block
11: Intermediate block
12: Lower block
13: Upper manifold
14: Lower manifold
15: Coating roll
16: Current collector sheet
20: Upper shim
21: Lower shim
22: Upper spacer
23: Lower spacer
25: Electrode slurry discharge line
26: Electrode slurry discharge portion
27: Insulating solution discharge line
28: Insulating solution discharge portion
30: Electrode slurry
31: Insulating solution
32: Electrode slurry layer
33: Insulating layer
34: Insulating layer including UV polymerization initiator
35: Insulating layer including cured UV polymerization initiator
40: UV lamp
100: Conventional electrode slurry coating slot die
110: Conventional insulating solution coating slot die
200: Dual slot die
θ: Angle between upper shim and lower shim

The invention claimed is:

1. A dual slot die comprising:
a lower block, an intermediate block, and an upper block, the dual slot die further including:
a UV lamp disposed on the dual slot die;
a lower shim positioned between the lower block and the intermediate block;
an upper shim positioned between the intermediate block and the upper block;
a lower manifold formed in the lower block to store an electrode slurry; and
an upper manifold formed in the upper block to store an insulating solution having an UV polymerization initiator,
wherein the dual slot die has a structure in which the electrode slurry is stored in the lower manifold and discharged by an electrode slurry discharge line in the lower shim to form an electrode slurry layer, and the insulating solution is stored in the upper manifold and discharged by insulating solution discharge lines in the upper shim to form an insulating solution layer,
wherein the insulating solution discharge lines include a first insulating solution discharge line and a second insulating solution discharge line,
wherein the dual slot die and the UV lamp are stationary, and
wherein the UV lamp is configured to irradiate the insulating solution layer creating a wall of an outer portion of the electrode slurry that prevents sliding of the electrode slurry layer.

2. The dual slot die of claim 1, wherein the upper shim extends along a first plane and the lower shim extends along a second plane such that the intersection of the first plane and the second plane forms an angle in the range of 20° to 60°.

3. The dual slot die of claim 1, further including one or more additional electrode slurry discharge lines in the lower shim, wherein the upper shim includes two additional insulating solution discharge lines for each of the additional electrode slurry discharge lines.

4. The dual slot die of claim 1, wherein an electrode slurry discharge portion of the electrode slurry discharge lines is positioned upstream along a current collector with respect to insulating solution discharge portions of the insulating solution discharge lines, and the UV lamp is positioned downstream from the insulating solution discharge portions.

5. The dual slot die of claim 1, wherein the width of a slurry discharge portion of the electrode slurry discharge line and the width of a solution discharge portion of the first insulating solution discharge line do not overlap in the vertical direction of the upper shim.

6. The dual slot die of claim 1, wherein the width of a slurry discharge portion of the electrode slurry discharge line and the width of a solution discharge portion of the first insulating solution discharge line overlap each other in the vertical direction of the upper shim, wherein the overlap ranges from 5% to 30% of the width of the insulating solution discharge portion.

7. The dual slot die of claim 1, wherein the UV lamp is disposed on the upper block.

8. The dual slot die of claim 1, wherein the dual slot die is configured to continuously discharge insulating solution from the insulating solution discharge lines onto a moving substrate.

\*  \*  \*  \*  \*